United States Patent [19]

Ohki

[11] Patent Number: 4,970,591
[45] Date of Patent: Nov. 13, 1990

[54] CONTROL OF AN ENCODING PARAMETER ACCORDING TO A RATIO OF A MOVING PICTURE AREA IN EACH FRAME

[75] Inventor: Junichi Ohki, Tokyo, Japan

[73] Assignee: NEC Corporation, Japan

[21] Appl. No.: 428,846

[22] Filed: Oct. 30, 1989

[30] Foreign Application Priority Data

Oct. 28, 1988 [JP] Japan ................................ 63-272785

[51] Int. Cl.$^5$ .......................... H04N 7/18; H04N 7/12
[52] U.S. Cl. ..................................... 358/136; 358/105
[58] Field of Search ............... 358/105, 133, 135, 136, 358/141

[56] References Cited

U.S. PATENT DOCUMENTS

| | | | |
|---|---|---|---|
| 4,689,672 | 8/1987 | Furukawa et al. | 358/105 |
| 4,722,003 | 1/1988 | Kondo | 358/135 |
| 4,729,021 | 3/1988 | Kondo | 358/105 |
| 4,887,156 | 12/1989 | Ohki | 358/133 |
| 4,901,149 | 2/1990 | Fernando et al. | 358/141 |

Primary Examiner—John W. Shepperd
Assistant Examiner—Michael D. Parker
Attorney, Agent, or Firm—Ostrolenk, Faber, Gerb & Soffen

[57] ABSTRACT

In an encoding device including a frame memory for memorizing an input moving picture signal as a memorized moving picture signal frame by frame and an encoding unit for encoding the memorized moving picture signal by using an encoding parameter, a control unit controls the parameter in compliance with a ratio which a moving picture area has relative to a frame picture represented by each frame of the input moving picture signal. The parameter should be fine and coarse when the ratio is small and great, respectively. As usual, a buffer memory of the encoding unit produces an amount signal indicative of an extent to which the buffer memory is full. Preferably, the control unit suspends encoding operation during a succeeding one of two successive frames when the amount signal indicates that the buffer memory became full in a preceding one of the two successive frames. The control unit makes the frame memory keep a frame of the memorized moving picture signal while suspending the encoding operation. If desired, the control unit controls the parameter additionally in compliance with a bit rate at which the encoding unit produces an encoded picture signal.

10 Claims, 2 Drawing Sheets

CONTROL OF AN ENCODING PARAMETER ACCORDING TO A RATIO OF A MOVING PICTURE AREA IN EACH FRAME

BACKGROUND OF THE INVENTION

This invention relates to encoding of a moving picture signal and, more particularly, to a method of controlling the encoding and to an encoding device for encoding the moving picture signal with control of the encoding.

A method and a device for controlling encoding of an input moving picture signal into an encoded picture signal are disclosed in a prior U.S. patent application Ser. No. 187,380 which was filed Apr. 28, 1988 now U.S. Pat. No. 4,887,156, by Junichi Ohki, the present inventor, and is incorporated by reference in the instant specification. According to the prior patent application, the input moving picture signal is used in deciding a ratio which a moving picture area has relative to a frame picture represented by each frame of the input moving picture signal. More specifically, a frame memory is used to memorize the input moving picture signal as a memorized moving picture signal frame by frame. The input and the memorized moving picture signals are used in deciding the ratio.

The ratio is used in controlling a bit rate at which the encoded picture signal is produced. More in detail, the input moving picture signal is transformed into transform coefficients having frequencies variable between a zero frequency, namely, a DC component, and a high frequency. The ratio is used in limiting the transform coefficients to lower frequency ones when it is necessary to keep the bit rate below a certain bit rate.

It was confirmed that the control was well performed according to the prior patent application with a high encoding efficiency and with a reproduced moving picture which was agreeable to watch. The fact should, however, be noted that the transform coefficients of higher frequency components are suppressed or omitted when band limitation is necessary.

SUMMARY OF THE INVENTION

It is therefore an object of the present invention to provide a method of controlling encoding of a moving picture signal without omitting a part of the moving picture signal.

It is another object of this invention to provide an encoding device for encoding a moving picture signal by controlling the encoding without omitting a part of the moving picture signal.

Other objects of this invention will become clear as the description proceeds.

According to this invention, there is provided a method of encoding a moving picture signal, comprising the steps of: (a) deciding a ratio which a moving picture area has relative to each frame picture; and (b) deciding an encoding parameter in compliance with the ratio.

According to this invention, there is provided an encoding device for encoding an input moving picture signal, comprising: (a) a frame memory for memorizing the input moving picture signal as a memorized moving picture signal frame by frame; (b) an encoding unit for encoding the memorized moving picture signal into an encoded picture signal by using an encoding parameter; and (c) control means supplied with the input and the memorized moving picture signals for controlling the encoding parameter in compliance with a ratio which a moving picture area has relative to a frame picture represented by each frame of the input moving picture signal.

DESCRIPTION OF THE PREFERRED EMBODIMENT

Figure 1:
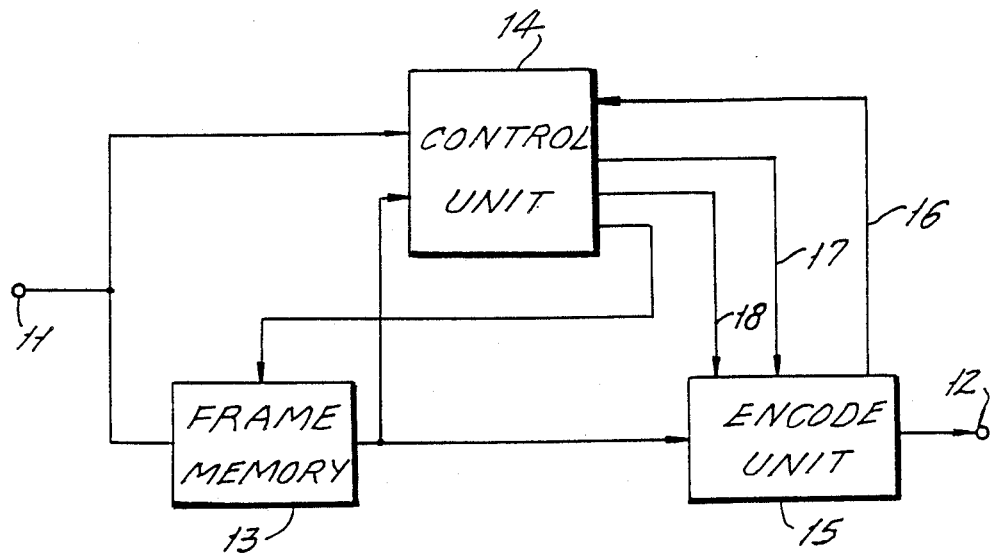
FIG. 1 is a block diagram of an encoding device according to an embodiment of the instant invention.

Referring to FIG. 1, the description will begin with an encoding device according to a preferred embodiment of the present invention. The encoding device is for encoding an input moving picture signal into an encoded picture signal. The input moving picture signal represents an original picture including a moving object.

The encoding device has encoder input and output terminals 11 and 12. The encoder input terminal 11 is supplied with the input moving picture signal. The encoded picture signal is delivered through the encoder output terminal 12 either to a transmission line or to a storage (both not shown). The encoded picture signal is processed by a counterpart decoding device into a reproduced moving picture signal which represents a reproduction of the original picture as a reproduced picture.

Like usual video signals, the input moving picture signal comprises successive frames representative of frame pictures. In the input moving picture signal, a part of the frame picture varies as a moving part between two successive frame pictures. In general, the encoded picture signal has an output bit or code rate which should not exceed a predetermined bit rate.

In the manner described in the prior patent application referred to hereinabove, encoding of the input moving picture signal is carried out, among others, by deciding a ratio which a moving picture area of the moving part has relative to each frame picture.

In order to decide the ratio, each frame picture is divided into a plurality of block pictures, each having a predetermined area, such as eight elementary picture by eight scanning lines. Each elementary picture is what is represented by a picture element or sample of the input moving picture signal. Each frame therefore consist of signal blocks representative of the respective block pictures.

In FIG. 1, a frame memory 13 is supplied with the input moving picture signal from the encoder input terminal 11 and with a write command signal which will become clear as the description proceeds. It may be mentioned here that the write command signal has one of two levels at a time, such as a one and a zero level, to indicate write-in of the input moving picture signal in the frame memory 13 as a memory content and to make the frame memory 13 hold or keep the memory content as it stands. Merely for convenience of the description, it will be assumed that the write command signal indicates storage and hold of the memory content by the one and the zero levels, respectively. In any event, the frame memory 13 memorizes the input moving picture signal as a memorized moving picture signal.

A control unit 14 is supplied with the input moving picture signal from the encoder input terminal 11 and the memorized moving picture signal from the frame memory 13 to calculate the ratio of the moving picture area to each frame picture. In the manner which will later be described more in detail, the control unit 14 may calculate a frame difference between the picture elements corresponding to each other in two successive frames and a sum of such frame differences in each signal block and may compare the sum with a threshold sum to judge whether or not the signal block in question represents a moving part to decide the ratio. Alternatively, the control unit 14 may calculate the ratio by resorting to a method which is known as a gradient method in the art. If the gradient method is used, the control unit 14 uses a brightness gradient of each frame picture and the frame differences in calculating movement vectors as regards the respective picture elements of the frame and in deciding the ratio from a set of picture elements for which the movement vectors are not zero vectors.

An encoding unit 15 is for encoding the memorized moving picture signal into the encoded picture signal by using an encoding parameter which may consist of a set of quantization levels. The encoding unit 15 includes a buffer memory for buffering the encoded picture signal before delivery to the encoder output terminal 12. When the ratio is small, the encoded picture signal does not much accumulate in the buffer memory. When the ratio is great, the buffer memory rapidly becomes full of the encoded picture signal.

It is known in the art in consideration of this fact to make the buffer memory produce an amount signal indicative of an extent to which the buffer memory is full. In the example being illustrated, the encoding unit 15 delivers the amount signal to a first connection 16. The buffer memory is depicted in the accompanying drawing of the prior patent application and should be understood as represented herein by the first connection 16.

Based primarily on the ratio, the control unit 14 decides the encoding parameter in the manner which will become clear as the description proceeds. A parameter signal representative of the encoding parameter is delivered to the encoding unit 15 through a second connection 17. It is preferred to make the control unit 14 suspend encoding operation of the encoding unit 15 when the buffer memory tends to overflow. To this end, the control unit 14 uses the amount signal in producing the write command signal and a suspension signal, which is delivered to the encoding unit 15 through a third connection 18.

When attention is directed to the buffer memory indicated by the first connection 16, the encoding unit 15 should be understood to comprise an encoder as indicated by a combination of the second and the third connections 17 and 18. The encoder is connected to the frame memory 13 and the control unit 14 to use the encoding parameter in encoding the memorized moving picture signal into what may be called an internal encoded signal. In this event, the buffer memory buffers the internal encoded signal to deliver the encoded picture signal to the encoder output terminal 12 and the amount signal to the first connection 16.

Figure 2:
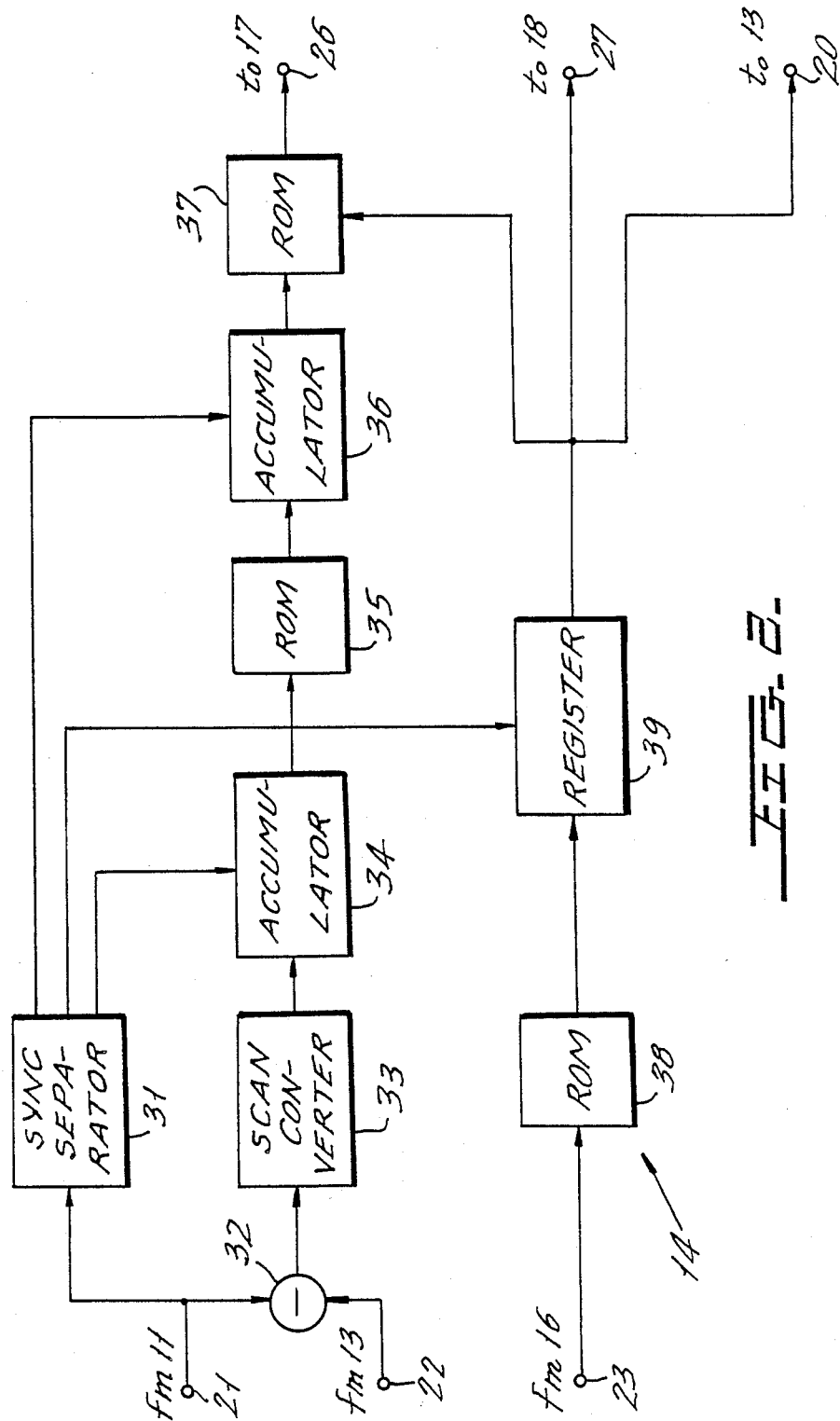
FIG. 2 is a detailed block diagram of a control unit for use in the encoding device depicted in FIG. 1.

Referring now to FIG. 2, the control unit 14 has first through third input terminals 21, 22, and 23 and first through third output terminals 26, 27, and 28. The first and the second input terminals 21 and 22 are supplied with the input and the memorized moving picture signals from the encoder input terminal 11 and the frame memory 13. The third input terminal 23 is supplied with the amount signal through the first connection 16. The first and the second output terminals 26 and 27 are for supplying the parameter signal and the suspension signal to the second and the third connections 17 and 18. The third output terminal 28 is for delivering the write comand signal to the frame memory 13. Incidentally, the frame memory 13 memorizes each frame of the input moving picture signal as a memorized frame to produce the memorized moving picture signal one frame period later than the input moving picture signal.

Through the first input terminal 21, the input moving picture signal is delivered to a synchronism separator 31. In the known manner, the synchronism separator 31 separates a frame synchronization signal from the input moving picture signal. Based on the frame synchronization signal, the synchronism separator 31 produces a frame reset signal and a frame pulse sequence. With reference to the frame synchronization signal, the synchronism separator 31 generates a block indication signal which indicates the respective signal blocks in the successive frames and therefore corresponds to the block start signals described in the prior patent application.

Supplied with the input and the memorized moving picture signals from the first and the second input terminals 21 and 22, a subtracter 32 produces a frame difference signal representative of the frame differences in the successive frames. In the manner briefly described before, each frame difference is a difference between a picture element in a current frame of the input moving picture signal and another picture element corresponding in the memorized moving picture signal to the picture element which is under consideration in the current frame.

The frame difference is equal to or near to zero when the elementary picture stands still or nearly still in two successive ones of the frame pictures. The frame difference grows greater as the elementary picture more widely varies from a preceding one of the two successive frame pictures to a succeeding one. This applies to a sum of absolute values of the frame differences in each signal block. When the sum is equal to or near to zero, the signal block is herein called a still block. When the sum is great, the signal block is called a moving block.

The frame difference signal is processed by a scan converter 33 into a scan converted signal comprising difference blocks for the successive frames. Each difference block consists of the frame differences in each signal block. Either the encoder input terminal 11 or the first input terminal 21 may be supplied with the input moving picture signal which is already made to comprise the signal blocks of the successive frames. In this event, the subtracter 32 produces the scan converted signal. The scan converter 33 becomes unnecessary.

The scan converted signal is delivered to an absolute value accumulator 34. Supplied from the synchronism separator 31, the block indication signal resets the accumulator 34 at a time instant of start of each signal block. The accumulator 34 thereby accumulates the sum of absolute values of the frame differences during each block period as a block accumulated value to produce an accumulated difference signal representative of the block accumulated values in the respective block periods of each of the successive frames.

The accumulated difference signal is delivered as an address signal to a decision read-only memory (ROM) 35 having a plurality of decision memory addresses. During each block period, the block accumulated values are used in accessing the memory addresses. The read-only memory 35 thereby discriminates between the still and the moving blocks in each signal block to produce a block decision signal which represents a decision value to indicate, for the successive frames, whether each signal block is a still or a moving block.

If each signal block should be discriminated only between the still and the moving blocks, each block accumulated value is compared by the decision read-only memory 35 with a single threshold value. The decision value is variable between two decision values, such as binary zero and one indicative of the still and the moving blocks. Each memory address is preliminarily loaded with the binary zero or one.

The block decision signal is delivered to a decision value accumulator 36. Supplied from the synchronism separator 31, the frame reset signal resets the decision value accumulator 36 at a time instant of start of each frame. The decision accumulator 36 thereby accumulates the decision values during each frame period as a frame accumulated value to produce an accumulated decision signal representative of the frame accumulated values in the successive frames. It is now appreciated that the frame accumulated signal for each frame represents the ratio of the moving picture area to the frame picture represented by the frame under consideration.

The accumulated decision signal is delivered as an address signal to a parameter read-only memory (ROM) 37 having a plurality of parameter memory addresses. Various encoding parameters are preliminarily stored in the parameter memory addresses. Accessed by the frame accumulated values, the parameter read-only memory 37 decides the encoding parameter for each frame in compliance with the ratio to deliver the parameter signal to the first output terminal 26 in the manner which will presently be described.

Reviewing FIGS. 1 and 2, the frame pulse sequence may be used as the frame reset signal. The synchronism separator 31 therefore produces the frame pulse sequence in addition to the block indication signal. In the control unit 14, a combination of the subtracter 32, the absolute value accumulator 34, the decision read-only memory 35, and the decision value accumulator 36 serves as a ratio calculating unit supplied with the input and the memorized moving picture signals and connected to the synchronism separator 31 for calculating the ratio.

In the control unit 14, the parameter read-only memory 37 serves as a parameter generator connected to the ratio calculating unit for producing the parameter signal. A combination of the synchronism separator 31, the ratio calculating unit, and the parameter generator serves as a parameter producing unit supplied with the input and the memorized moving picture signals for producing a parameter signal representative of the encoding parameter controlled in compliance with the ratio. Connected to the parameter producing unit, the second connection 17 serves as a supply arrangement for supplying the parameter signal to the encoder of the encoding unit 15.

Figure 3:
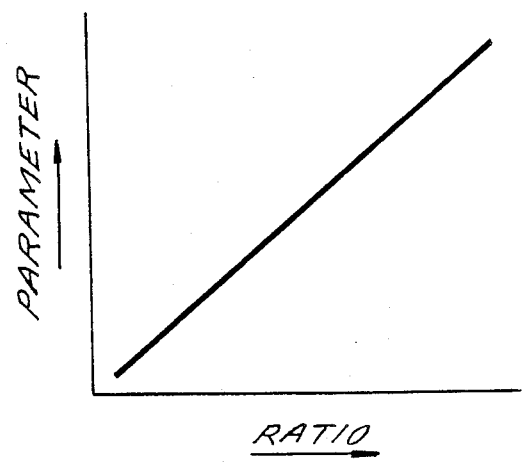
FIG. 3 is a line diagram for use in describing operation of the encoding device illustrated in FIG. 1.

Turning to FIG. 3 for a short while, the encoding parameters are selected by preliminarily statistically studying a relationship between the ratio and an optimum encoding parameter in consideration of the predetermined bit rate. In order that the reproduced picture can be watched to represent smooth movement of the moving object, it is desirable to decide the encoding parameter fine. It is, however, desirable to decide the encoding parameter coarse when the output bit rate tends to exceed the predetermined bit rate. In other words, the encoding parameter is preferably decided fine and coarse when the ratio is smaller and greater.

In FIG. 3, the abscissa shows the ratio and the ordinate, the encoding parameter. It will be seen that the encoding parameter linearly varies from a fine one to a coarse one when the ratio varies from a small one to a great one. It is more preferred to decide the encoding parameter with attention directed to visual characteristics of the human eyes. The encoding parameter may therefore vary nonlinearly with the ratio.

Turning back to FIG. 2, the amount signal is delivered from the third input terminal 23 to an operation control read-only memory (ROM) 38 having a plurality of operation control memory addresses. Accessed by the amount signal, the control read-only memory 38 produces an operation control signal which indicates for the successive frames whether the encoding unit 15 should be kept in operation or temporarily put out of operation. It will readily be understood that the encoding unit 15 should be kept in operation unless the buffer memory is full. When the buffer memory becomes full, the operation should be temporarily suspended. During suppression of operation of the encoding unit 15, the frame memory 13 should keep its memory content.

Suspension and progress of the encoding operation should be determined for the next succeeding frame when the amount signal exceeds and does not exceed a predetermined threshold amount. In connection with the threshold amount, the control memory addresses are preliminarily loaded with two control values, such as binary zero and one for the suspension and the progress.

The operation control signal is delivered to a register 39. Supplied from the synchronism separator 31, the frame pulse sequence sets the operation control signal in the register 39 substantially at a time instant of start of each frame period to make the register 39 deliver an output control signal during each frame period to the second and the third output terminals 27 and 28 as the suspension signal and the write command signal. When the operation control signal has the binary zero and one values, the write command signal has the zero and the one levels.

The output control signal is furthermore delivered to the parameter read-only memory 37 to make the memory 37 deliver and not deliver the parameter signal to the first output terminal 26 when the operation control signal indicates the progress and the suspension of operation of the encoding unit 15. This enables the encoding unit 15 encode the memorized moving picture signal continuously in cooperation with the buffer memory without omission of even a part of the memorized moving picture signal despite the fact that the encoding unit 15 may temporarily be put out of operation during a frame period.

Again reviewing FIGS. 1 and 2, it is now understood that the operation control read-only memory 38 serves as a control signal producing unit connected to the buffer memory for producing the operation control signal indicative of the suspension when the buffer memory becomes full in one of the successive frames. Connected to the control signal producing unit and the synchronism separator 31, the register 39 produces the operation control signal as the output control signal in a succeeding one of two successive frames to suspend the encoding operation when the buffer memory became full in a preceding one of the two successive frames.

A combination of the synchronism separator 31, the control signal producing unit, and the register 39 serves as a suspending arrangement. Connected to the buffer memory and the encoder of the encoding unit 15 and supplied with the input and the memorized moving picture signals, the suspending arrangement suspends the encoding operation during the succeeding one of the two successive frames when the amount signal indicates that the buffer memory became full in the preceding one of the two successive frames.

The frame memory 13 is connected to the suspending arrangement to hold the memorized moving picture signal throughout the preceding and the succeeding ones of the two successive frames when the encoding operation is suspended during the succeeding one of the two successive frames. Additionally, the suspending arrangement is connected to the parameter producing unit to suspend production of the parameter signal while suspending the encoding operation.

In connection with FIG. 2, a set of numerical examples will be given. Each of the decision and the parameter read-only memories 35 and 37 may have sixteen memory addresses. In contrast, it is desirable that the operation control read-only memory 38 should have as many as 1,024 memory addresses.

While this invention has thus far been described in specific conjunction with a sole preferred embodiment thereof, it will now be readily possible for one skilled in the art to carry this invention into effect in various other manners. For example, the encoding parameter can be decided additionally in compliance with the predetermined bit rate in the manner discussed in detail in the prior patent application. The frame, as herein called, can be a field known in television signals.

What is claimed is:

1. A method of controlling encoding of a moving picture signal, comprising the steps of:
   deciding a ratio which a moving picture area has relative to each frame picture; and
   deciding an encoding parameter in compliance with said ratio.

2. A method as claimed in claim 1, wherein said encoding parameter is decided fine and coarse when said ratio is smaller and greater, respectively.

3. An encoding device for encoding an input moving picture signal, comprising:
   a frame memory for memorizing said input moving picture signal as a memorized moving picture signal frame by frame;
   an encoding unit for encoding said memorized moving picture signal into an encoded picture signal by using an encoding parameter; and
   control means supplied with said input and said memorized moving picture signals for controlling said encoding parameter in compliance with a ratio which a moving picture area has relative to a frame picture represented by each frame of said input moving picture signal.

4. An encoding device as claimed in claim 3, wherein said control means controls said encoding parameter fine and coarse when said ratio is smaller and greater, respectively.

5. An encoding device as claimed in claim 4, said encoding unit comprising an encoder connected to said frame memory and said control means for encoding said memorized moving picture signal into an internal encoded signal by using said encoding parameter and a buffer memory for buffering said internal encoded signal to produce said encoded picture signal and an amount signal indicative of an extent to which said buffer memory is full of said internal encoded signal, wherein said control means comprises:
   parameter producing means supplied with said input and said memorized moving picture signals for producing a parameter signal representative of said encoding parameter controlled in compliance with said ratio;
   supply means connected to said parameter producing means for supplying said parameter signal to said encoder; and
   suspending means connected to said encoder and said buffer memory and supplied with said input and said memorized moving picture signals for suspending encoding operation of said encoder during a succeeding one of two successive frames when said amount signal indicates that said buffer memory became full in a preceding one of said two successive frames.

6. An encoding device as claimed in claim 5, said frame memory being for memorizing each frame of said input moving picture signal as a memorized frame, wherein:
   said frame memory is connected to said suspending means to hold said memorized frame throughout said preceding and said succeeding ones of the two successive frames when said amount signal indicates that said buffer memory becomes full in said preceding one of the two successive frames.

7. An encoding device as claimed in claim 5, wherein said suspending means is connected to said parameter producing means to suspend production of said parameter signal while suspending said encoding operation.

8. An encoding device as claimed in claim 5, wherein:
   said parameter producing means and said suspending means share a synchronism separator in common, said synchronism separator being supplied with said input moving picture signal to produce a frame pulse sequence indicative of successive frames of said input moving picture signal;
   said suspending means comprising means connected to said synchronism separator and supplied with said amount signal for suspending said encoding operation in said succeeding one of the two successive frames when said amount signal indicates that said buffer memory became full in said preceding one of the two successive frames;
   said parameter producing means comprising;
   ratio calculating means supplied with said input and said memorized moving picture signals and connected to said synchronism separator for calculating said ratio; and
   a parameter generator connected to said ratio calculating means and said means of the suspending means for producing said parameter signal while said means of the suspending means does not suspend said encoding operation.

9. An encoding device as claimed in claim 8, wherein said means of the suspending means comprises:
   control signal producing means connected to said buffer memory for producing an operation control signal when said buffer memory becomes full in said preceding one of the two successive frames; and a register connected to said control signal producing means and said synchronism separator for producing said operation control signal in said succeeding one of the two successive frames to suspend said encoding operation.

10. An encoding device as claimed in claim 4, wherein said control means controls said encoding parameter additionally in compliance with a bit rate at which said encoding unit produces said encoded picture signal.

* * * * *